United States Patent
Tuttle et al.

(10) Patent No.: US 9,510,498 B2
(45) Date of Patent: *Dec. 6, 2016

(54) METHOD FOR AUTOMATICALLY LEVELING A FARM IMPLEMENT

(71) Applicant: CNH Industrial Canada, Ltd., Saskatoon, CA (US)

(72) Inventors: Thomas Tuttle, Naperville, IL (US); Tyler Remoue, Rockglen (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,347

(22) Filed: Oct. 10, 2014

(65) Prior Publication Data

US 2015/0027740 A1    Jan. 29, 2015

Related U.S. Application Data

(62) Division of application No. 13/248,865, filed on Sep. 29, 2011, now Pat. No. 8,909,435.

(51) Int. Cl.
| A01B 63/22 | (2006.01) |
|---|---|
| A01B 73/04 | (2006.01) |
| A01B 59/042 | (2006.01) |
| A01B 63/16 | (2006.01) |
| A01C 7/20 | (2006.01) |

(52) U.S. Cl.
CPC ............ *A01B 63/16* (2013.01); *A01B 59/042* (2013.01); *A01B 63/22* (2013.01); *A01B 73/044* (2013.01); *A01C 7/208* (2013.01)

(58) Field of Classification Search
CPC .... A01B 59/042; A01B 59/04; A01B 59/00; A01B 63/22; A01B 63/16; A01B 63/14; A01B 63/00; A01B 73/044; A01B 73/04; A01B 73/02; A01B 73/00; A01C 7/208; A01C 7/20; A01C 7/00
USPC ............ 701/50; 111/200, 121; 172/311, 456, 172/459, 463
See application file for complete search history.

(56) References Cited

U.S. PATENT DOCUMENTS

| 2,830,519 | A | | 4/1958 | Chandler et al. |
|---|---|---|---|---|
| 3,627,053 | A | | 12/1971 | Hook et al. |
| 3,762,480 | A | | 10/1973 | Hofer |
| 4,320,805 | A | | 3/1982 | Winter |
| 4,480,438 | A | * | 11/1984 | Breeden ............... F16H 61/433 |
| | | | | 60/389 |
| 5,348,101 | A | | 9/1994 | Fox et al. |
| 5,546,847 | A | | 8/1996 | Rector et al. |
| 5,894,894 | A | | 4/1999 | Szymczak |
| 5,899,950 | A | | 5/1999 | Milender et al. |
| 6,040,671 | A | | 3/2000 | Brito et al. |
| 6,318,477 | B1 | | 11/2001 | Bettin |

(Continued)

*Primary Examiner* — Christopher J Novosad
(74) *Attorney, Agent, or Firm* — Rebecca L. Henkel

(57) ABSTRACT

A method and apparatus for automating some of the tasks that heretofore required operator action at headland turns or similar events are provided. The present invention automates operation of lift assist wheels and/or gull wings, such as those found on a stack-fold implement, based on the position of the tractor hitch to which the implement is coupled. An operator may control the position of the implement, such as at a headland turn, by raising and lowering the tractor hitch using a remote control. The invention enables the planter to compare the tractor hitch position relative to an implement position and control operation of the implement accordingly without additional user inputs.

6 Claims, 6 Drawing Sheets

(56) References Cited

U.S. PATENT DOCUMENTS

| | | |
|---|---|---|
| 6,378,619 B2 | 4/2002 | Mayerle et al. |
| 6,675,907 B2 | 1/2004 | Moser et al. |
| 7,739,015 B2 | 6/2010 | Senneff et al. |
| 8,909,435 B2 * | 12/2014 | Tuttle .................. A01B 63/22 111/200 |
| 2004/0016556 A1 | 1/2004 | Barber |
| 2005/0087378 A1 | 4/2005 | Hrazdera |
| 2009/0187315 A1 | 7/2009 | Yegerlehner et al. |

* cited by examiner

METHOD FOR AUTOMATICALLY LEVELING A FARM IMPLEMENT

CROSS-REFERENCE TO RELATED APPLICATION

The present application is a divisional of application Ser. No. 13/248,865 filed Sep. 29, 2011.

BACKGROUND OF THE INVENTION

The present invention is generally directed to farm implements and, more particularly, to a method and apparatus for remotely controlling the hydraulics of a tractor or other implement towing vehicle.

Increasingly, farm implements have been designed to have frames that can be folded between field-working and transport positions. One such type of farm implement is a stack-fold planter, such as the 1230 Stackerbar planter from Case New Holland, LLC, Stack-fold planters generally consist of a center frame section and a pair of wing frame sections. In the field-working position, the wing frame sections are evenly aligned with the center frame section. In the transport position, however, the wing sections are lifted to a position directly above the center frame section, i.e., to a "stacked" position. In the stacked position, the width of the implement is generally that of the center frame section, thus making the implement better suited for transport along roads and between crops.

Openers are mounted to the frame sections at equal intervals, with each of the wing sections typically carrying one-half the number of openers mounted to the center frame section. The openers are designed to a cut a furrow into a planting surface, deposit seed and/or fertilizer into the furrow, and then pack the furrow. In this regard, each opener will have a seed box that is manually loaded with seed and/or fertilizer. Since the size of the seed box determines how much particulate matter the box can retain, there is generally a desire to have larger seed boxes for each of the openers. Since the larger seed boxes can hold more material, fewer refilling stops are needed when planting a field.

Larger seed boxes, however, have drawbacks. The additional material that can be carried by larger seed boxes adds to the overall weight of the openers, including those mounted to the wing sections. This additional weight can stress the lifting/lowering system that stacks the wing sections, or require a more robust system, which can add to the overall size, mass, complexity, and cost of the implement. Larger spacing between seed trenches lower per acre crop yields. Further, it can be problematic and time consuming to individually fill each of the seed boxes, whether using bags or a conveyor system.

Accordingly, bulk fill systems have been designed for stack-fold planters that generally consist of one or more bulk fill tanks mounted to a frame or toolbar that can be coupled to the frame of the stack-fold planter. The frame for the bulk fill system is supported above the ground by a lift wheel assembly that is designed to raise the frame when the stack-fold planter is in transport. Oftentimes, an operator will also raise the bulk fill system frame at headland turns when the gull wings are also raised to provide additional implement stability.

Raising the gull wings and the frame for the bulk fill hopper(s) at headland turns poses one of the challenges that is faced by an operator when making a headland turn onto a new swath. More particularly, as the operator of a planter arrives at the headland of a field, the operator has to perform numerous tasks to reposition the planter in the next swath. Many of these tasks require the operator to attempt simultaneous control of three or more operations. For stack-fold planters equipped with lift assist wheels and/or gull wings, the operator needs to) retract the gull wings to prevent the wings from drooping when lifted from the ground, elevate the three-point hitch that connects the stack-fold planter to the towing vehicle, e.g., tractor, and extend the lift wheel assembly to raise the bulk fill system. The operator will also need to slow the tractor by shifting and/or reducing engine speed. By requiring the operator to perform these tasks substantially simultaneously, the operator can become mentally and physically fatigued, require an enhanced skill level to operate the stack-fold planter, increase the likelihood that the operator may make an error, or reduce the performance of the stack-fold planter at headland turns.

SUMMARY OF THE INVENTION

The present invention is directed to a method and apparatus for automating some of the tasks that heretofore required operator action at headland turns or similar events. For example, in one embodiment, the present invention automates operation of lift assist wheels and/or gull wings, such as those found on a stack-fold implement, based on the position of the tractor hitch to which the implement is coupled. Accordingly, an operator may control the position of the implement, such as at a headland turn, by raising and lowering the tractor hitch using a conventional remote control. The invention enables the planter to compare the tractor hitch position relative to an implement position and control operation of the implement accordingly without additional user inputs.

In accordance with one aspect of the invention, a farm implement has a toolbar configured to be coupled to a towing vehicle and a bulk fill hopper mounted to a frame that is supported by a lift wheel assembly. The farm implement further has a connector for coupling the toolbar to a hitch of the towing vehicle. A first electrical input receives a hitch position signal from the towing vehicle and a second electrical input receives a frame position signal. The implement further has an electronic control unit (ECU) that receives the hitch position and the frame position signals and automatically activates the lift wheel assembly to maintain the frame in a level position as the vertical position of the connector changes.

In accordance with another aspect of the invention, a farm implement having a frame supported by a lift wheel assembly comprises a connector for coupling the toolbar to the ISOBUS hitch of a towing vehicle, a first electrical input that receives a hitch position signal from the tractor, an electric over hydraulic valve that controls hydraulic fluid flow from the hydraulic system to the lift wheel assembly, and an electronic control unit (ECU). The ECU receives the hitch position signal and provides a command signal to the electric over hydraulic valve to control hydraulic fluid flow in the hydraulic system to raise the frame when the hitch is in a raised position.

The present invention is also embodied in a method for automatically leveling a farm implement having a frame and being towed by a tractor that is coupled to the farm implement by a hitch. The method, which is preferably carried out automatically using various electronics, includes receiving a hitch position signal from the tractor and receiving a frame position signal from a sensor that detects a position of the frame. The method further includes the step of automatically raising or lowering the frame in response to changes in hitch position of the tractor.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

As will be made apparent from the following description, the present invention provides an apparatus that automatically adjusts the position of an implement in response to changes in the position of the hitch of a tractor towing the implement. For purposes of description, the invention will be described with respect to a stack-fold planter, such as that shown in FIGS. 1-4, but it is understood that the invention is applicable with other types of implements. The invention, which can also be embodied in an automated method, is designed to reduce the number of user inputs that were heretofore required to command movements of the implement, such as at headland turns.

Figure 1:
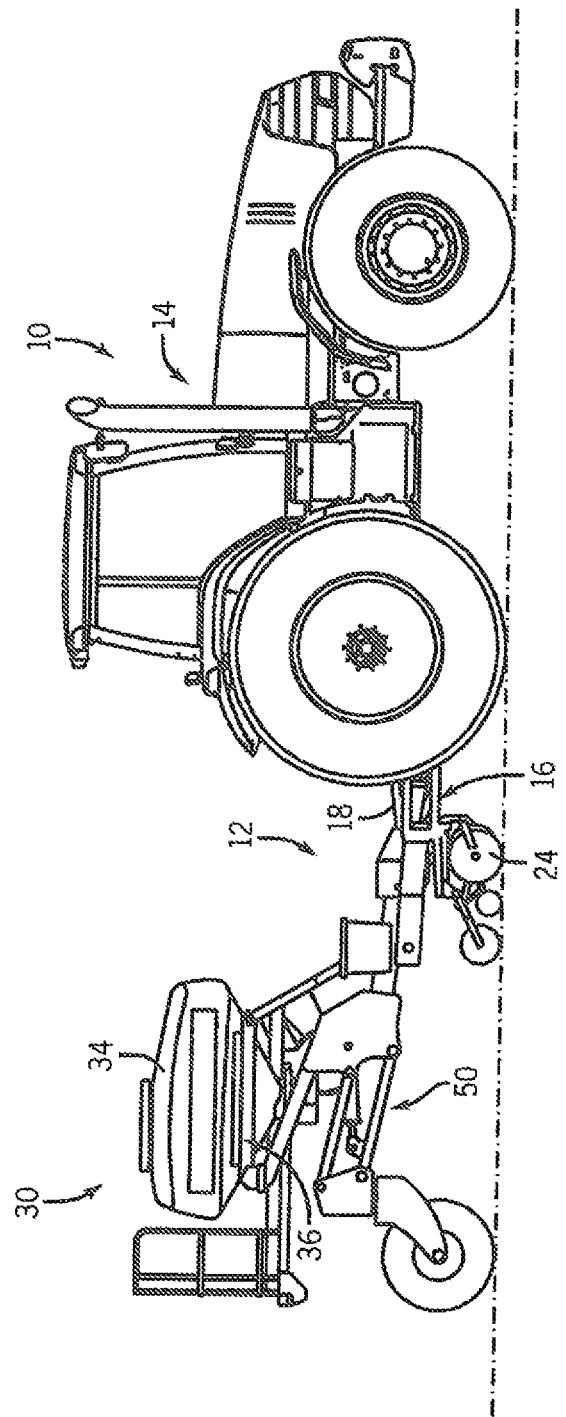
FIG. 1 is a pictorial view of an agricultural planting system comprised of a stack-fold planter coupled to a tractor.
Figure 2:
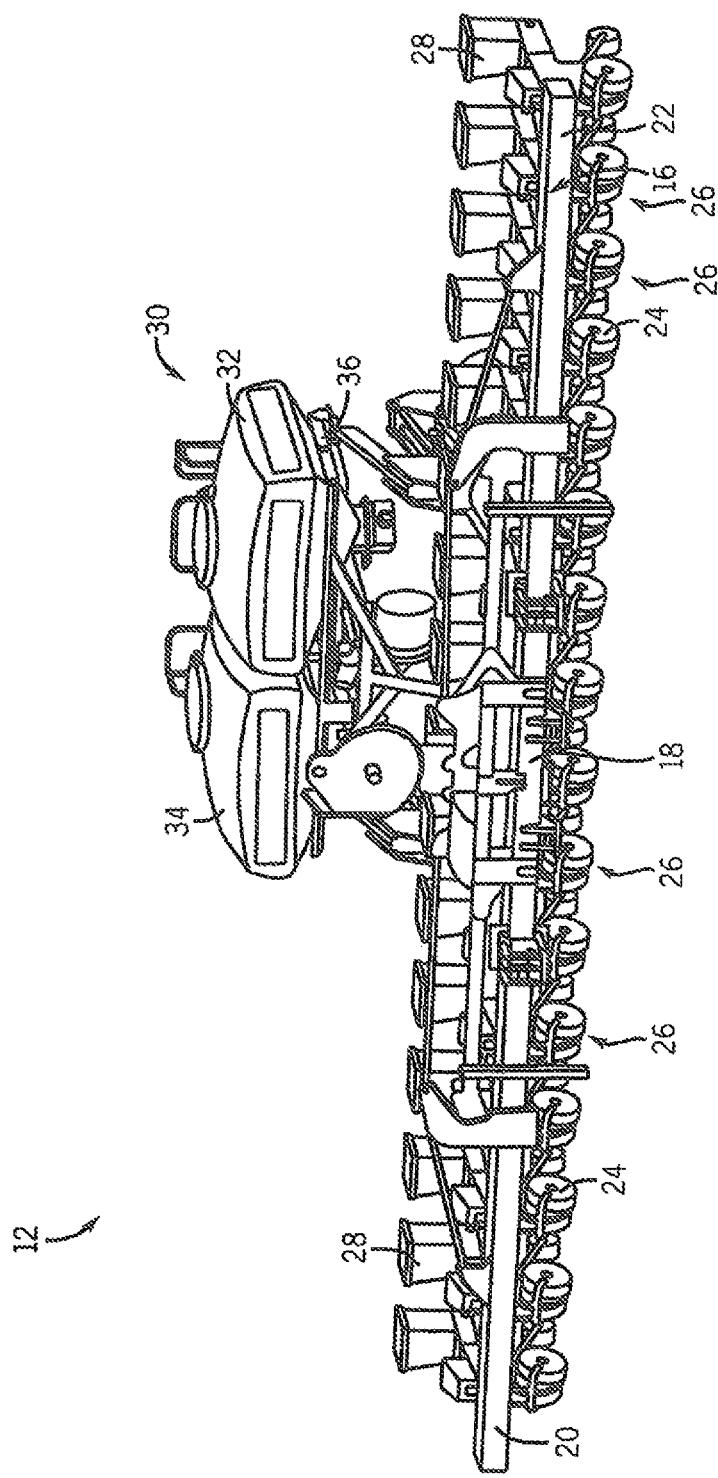
FIG. 2 is an isometric view of the stack-fold planter of FIG. 1 in a field-working (float) position.

Turning now to FIGS. 1-4, a planting system 10 includes a stack-fold implement 12, shown in a field working position, coupled to a prime mover 14, e.g., tractor, in a known manner. For purposes of illustration, the stack-fold implement 12 is a row crop planter, which as shown in FIG. 2, includes a frame 16 generally comprised of a center section 18 and wing sections 20, 22 on opposite lateral sides of the center section. The center section 18 includes a tongue (not shown) that extends forwardly of the center section 18 for hitching the implement 12 to the prime mover 14. As will be described more fully below, the implement 12 is coupled to a three-point hitch of the prime mover 14. Gauge wheels 24 on the frame sections 18, 20, and 22 set the seeding or cutting depth for the implement.

Figure 3:
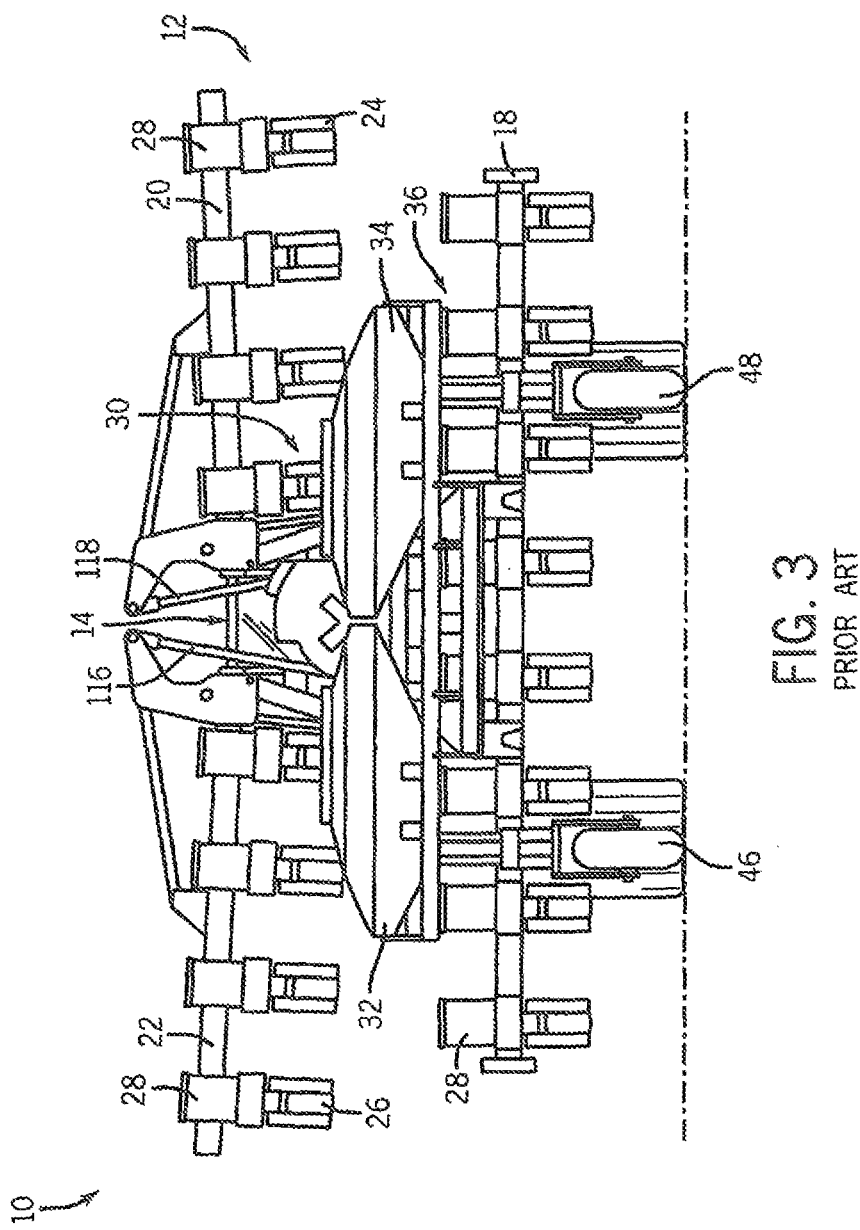
FIG. 3 is a rear elevation view of the stack-fold planter of FIG. 1 in a stacked, transport position.

In the illustrated embodiment, sixteen openers 26 are mounted to the frame 16 at equally spaced intervals, but it is understood that more than or fewer than sixteen openers could be mounted to the frame 16. As known in the art, the wing sections 20, 22 may be raised to a transport position, as shown in FIG. 3, in which the openers carried by the wing sections 20, 22 are stacked over the center section 18. As also known in the art, the openers 26 are designed to cut a furrow into the soil, deposit seed and/or fertilizer into the furrow, and then pack the furrow. Seed boxes or "minihoppers" 28 are optionally mounted to each of the openers 26. The mini-hoppers 28 are preferably smaller than conventional mini-hoppers used with stack-fold crop row planters and thus hold less material than conventional seed boxes.

The smaller mini-hoppers are flow-coupled to a central bulk fill assembly 30 that delivers material, such as seed and/or fertilizer, to the openers 26 and/or the mini-hoppers 28. The central bulk fill assembly 30 preferably includes a pair of bulk fill hoppers 32 and 34 supported adjacently to one another on a frame 36. The frame 36 is coupled to the center section 18 by a set of rearwardly extending frame members 38, 40, and 42 connected to a crossbar 44. In a preferred embodiment, the frame members 38, 40, 42 are removably coupled to center frame section 18 which allows the bulk fill assembly 30 to be removed from the implement 12 or added as an after-market add-on to an existing stack-fold implement.

The frame 36 is supported above the work surface (or transport surface) by a pair of wheels 46, 48 that are each connected to the frame by a wheel lift assembly 50, which in the illustrated embodiment includes a pair of parallel linkages 52, 54. Each linkage includes upper links 56, 58 and lower link 60, 62, respectively. In addition to the links 56-62, a pair of lift arms 64, 66 are provided. Lift arm 64 is coupled to frame member 42 at a knuckle 68 to which parallel linkage 52 is also connected. In a similar manner, lift arm 66 is coupled to frame member 38 at a knuckle 70 to which parallel linkage 54 is also connected. As shown particularly in FIG. 4, the frame 36 further includes a Y-beam 72 that is pivotally coupled to the center frame member 40. As is customary for most central bulk fill assemblies, an air blower 74 is mounted beneath the bulk fill hoppers and is operable transfer particulate matter from the hoppers 32, 34 to the individual mini-hoppers 28 or directly to the openers 26 in a forced air stream.

As known in the art, central bulk fill hoppers, such as those described above, provide the convenience of a central fill location rather than having to fill the individual seed boxes. Also, the central fill hoppers have greater capacity than the seed boxes, which reduces the number of fill iterations that must be taken when planting. Simply mounting a central bulk fill assembly to a stack-fold planter, such as planter 12, can create stability issues, especially when the stack-told planter is in the transport position. In this regard, the present invention provides a mechanism for raising the bulk fill assembly 30 when the stack-fold planter 10 is in the folded, transport position. Raising the bulk assembly 30 provides greater stability during transport as well provides increased clearance between the hulk fill assembly 30 and the roadway.

Figure 4:
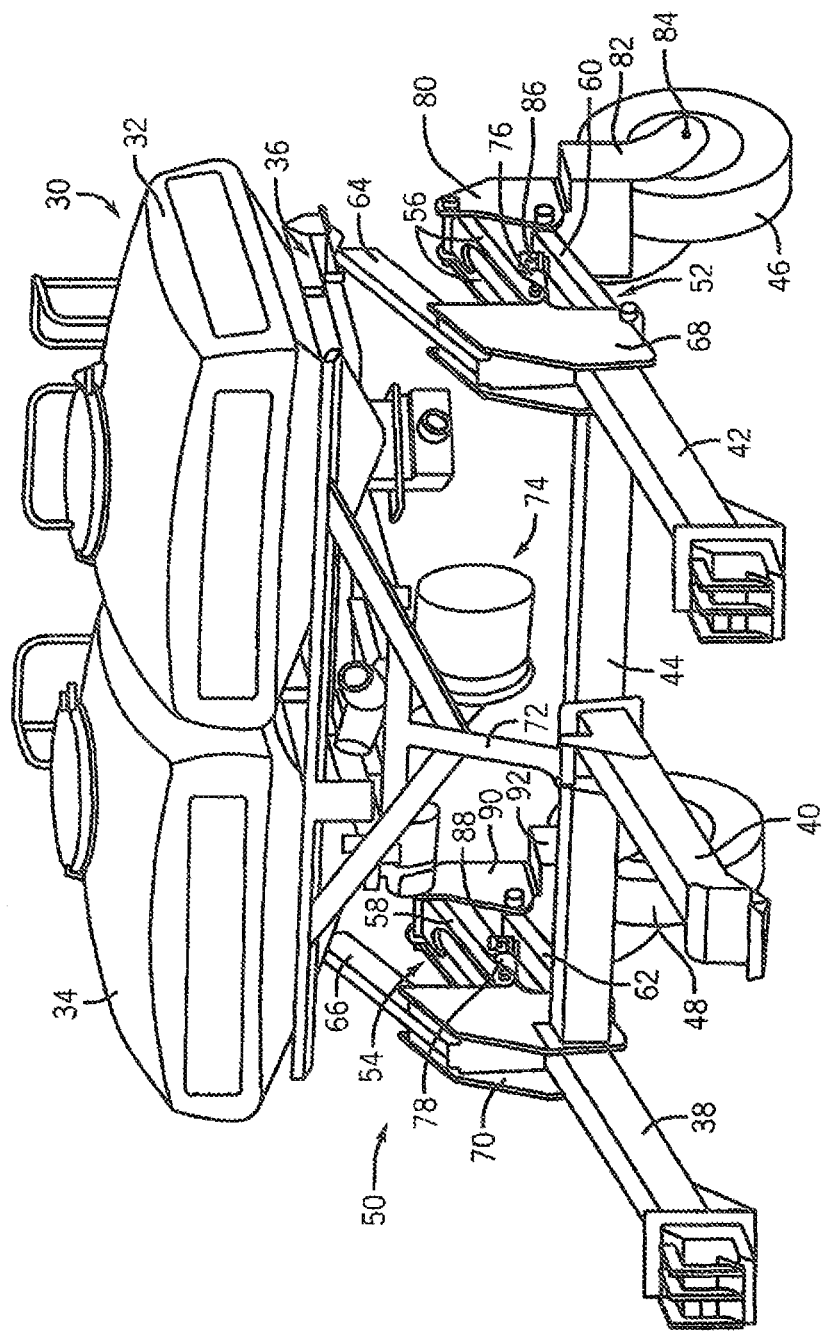
FIG. 4 is an isometric view of the central bulk fill system of FIG. 1 in a lowered, field working position.

A pair of hydraulic lift cylinders 76 and 78 are operable for lifting the frame 36, and thus the bulk fill assembly 30. Cylinder 76 is interconnected between forward knuckle 68 and a rearward knuckle 80. As shown in FIG. 4, the rearward knuckle 74 includes, or is coupled to, a mounting arm 82 that is coupled to axle 84 about which wheel 46 rotates. Cylinder 76 includes a ram 86 that is coupled to the rearward knuckle 80 whereas cylinder 76 is coupled to the forward knuckle 68. In a similar fashion, cylinder 78 includes a ram 88 connected to a rearward knuckle 90 whereas the cylinder 78 is connected to the forward knuckle 70. It will be appreciated that a mounting arm 92 is connected to, or formed with, the rearward knuckle 90, and the mounting arm 92 is connected to an axle (not shown) about which wheel 48 rotates.

As known in the art, central bulk fill hoppers, such as those described above, provide the convenience of a central fill location rather than having to fill the individual seed boxes. Also, the central fill hoppers have greater capacity than the seed boxes, which reduces the number of fill iterations that must be taken when planting. Simply mounting a central bulk fill assembly to a stack-fold planter, such as planter 12, can create stability issues, especially when the stack-fold planter is in the transport position. In this regard, the present invention provides a mechanism for raising the bulk fill assembly 30 when the stack-fold planter 10 is in the folded, transport position. Raising the bulk assembly 30 provides greater stability during transport as well provides increased clearance between the bulk fill assembly 30 and the roadway.

Figure 5:
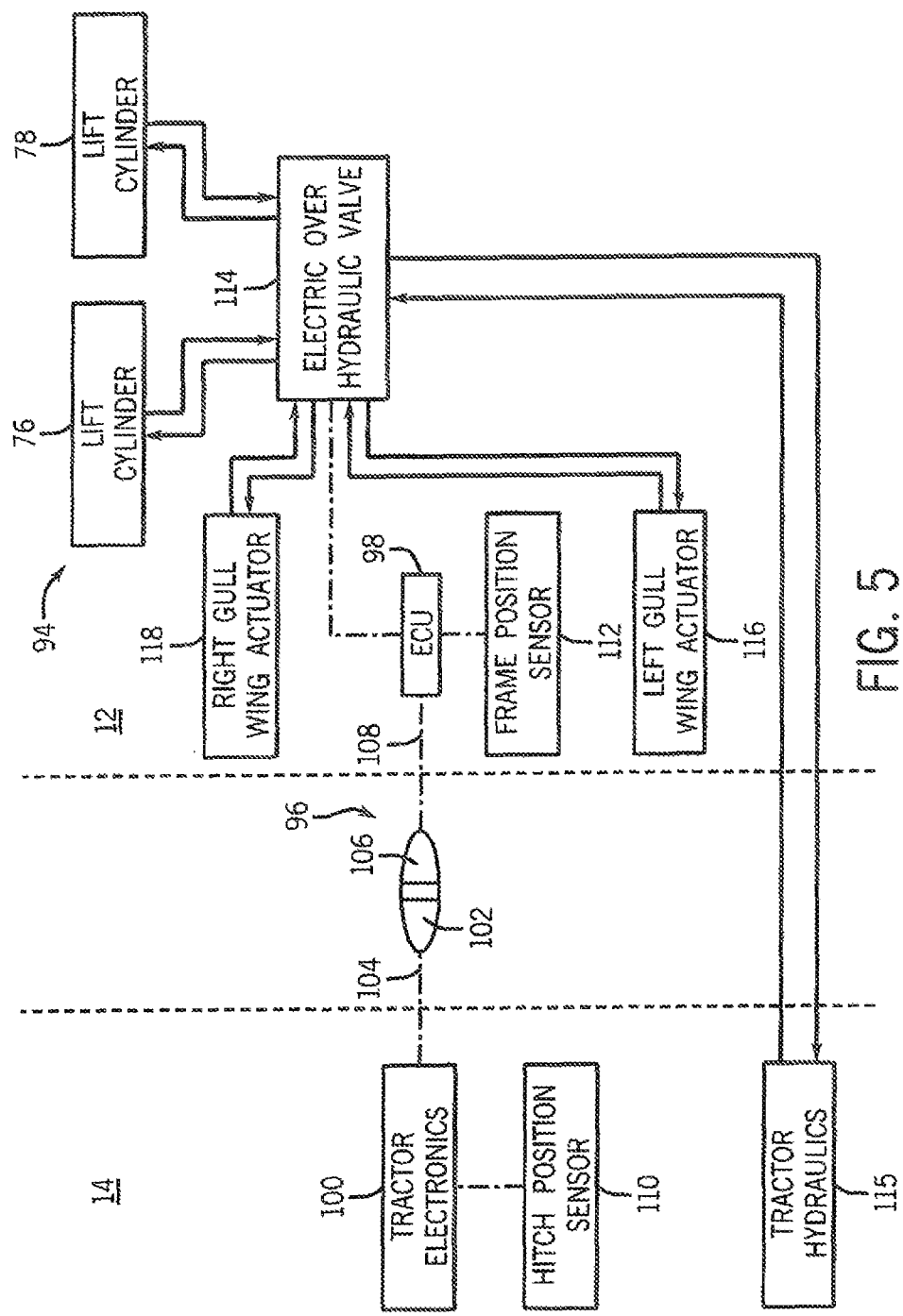
FIG. 5 is a schematic block diagram of a hydraulic control system according to one embodiment of the invention.

Turning now to FIG. 5, the present invention provides a communications apparatus 94 for use with a prime mover equipped with ISO 11783 technology. The communications apparatus 94 includes datalink 96 that communicatively links an implement electronic control unit (ECU) 98 with electronics 100 of the prime mover 14. The datalink 96 may be a wireless connection or, as shown in FIG. 5, a wired communication consisting a connector 102 tethered by cable 104 to the electronics 100 and a receiver 106 tethered by cable 108 to ECU 98. In a preferred embodiment, the connector 102 and the receiver 106 are ISO 11783 components that permit the transfer of data between the prime mover electronics 100 and the ECU 98. Thus, it will be appreciated that the datalink 96 provides an ISOBUS connection between the prime mover 14 and the stack-fold implement 12.

The ISOBUS connection enables the transmission of various data between the stack-fold implement 12 and prime mover 14. One type of data is hitch position information. The prime mover 14 has a hitch position sensor 110 that provides feedback to the electronics 100 of the prime mover 14 as to the vertical position of the coupling between the stack-fold implement 12 and the prime mover 14. In one embodiment, this coupling is a three-point hitch. The prime mover electronics 100 provides a data signal to the ECU 98 via datalink 96 containing hitch position information. In accordance with one aspect of the invention, the ECU 98 adjusts the vertical position of the stack-fold implement 12 accordingly.

More particularly, the stack-fold implement 12 has a frame position sensor 112 that measures the vertical position of the central bulk fill assembly 30. In one preferred embodiment, the vertical position is determined from the angle between frame 36 and the wheel lift assembly 50. It is contemplated that a number of sensors may be used to measure this angle including, but not limited to, rotary potentiometers, displacement sensors, optical sensors, strain gauges, pressure sensors, and the like. For example, in one embodiment, the frame position sensor 112 measures the displacement of either hydraulic lilt cylinder 76 or hydraulic lift cylinder 78.

The ECU 98 receives the frame position signal from the frame position sensor 112 and compares the frame position of the stack-fold implement 12 with the vertical position of the hitch, as provided in the hitch position signal. From this comparison, the ECU 98 raises or lowers the central bulk fill assembly 30 to level the central bulk fill assembly 30 in light of the changes in vertical position of the prime mover hitch.

In one embodiment of the invention, the central bulk fill assembly 30 is raised or lowered by ECU 98 controlling operation of an electric over hydraulic valve 114. The hydraulic valve 114 is interconnected between the hydraulics 115 of the prime mover 14 and the hydraulics of the stack-fold implement 12, which include the pair of hydraulic lift cylinders 76, 78. Thus, the hydraulic valve 114, upon receipt of a corresponding command signal from the ECU 98, can increase or decrease the pressure in the pair of hydraulic lift cylinders 76, 78 to raise or lower, respectively, the central bulk fill assembly 30. It is highly desirable to increase the elevation of the central bulk fill assembly 30 when the hitch is raised and, conversely, lower the elevation when the hitch is lowered.

In a further embodiment of the invention, also shown schematically in FIG. 5, the wing sections 20, 22 are moved automatically based on the vertical position of the three-point hitch. As known in the art, the hydraulic components, including lift actuators 116, 118 are used to raise and lower the left wing section 22 ("left side gull wing") and the right wing section 20 ("right side gull wing"), respectively. In this further embodiment, the ECU 98 also provides command signals to the left and right lift actuators, which can be of conventional design. In a preferred embodiment, the lift actuators are hydraulic cylinders whose operation is controlled by a valve, such as hydraulic valve 114. As such, the ECU 98 provides control commands to the hydraulic valve 114 which in turn controls operation of the lift actuators preferably in synchrony with the wheel lift assembly 50.

It will be appreciated that the wing sections are movable between a field working position, such as illustrated in FIG. 2 and a retracted or raised position, such as illustrated in FIG. 3. In the field working position, the wing sections (as well as the center section) are free to float so to respond to changes in surface contours. In this regard, the ECU 98 commands the electric over hydraulic valve 114 to control hydraulic fluid flow in the hydraulic system to move the wing sections to the float position when the hitch is in a fully lowered position.

It will also be appreciated that in the embodiment illustrated in FIG. 5, the operator of the tractor, i.e., towing vehicle, using conventional hydraulic remotes, pressurizes the tractor's hydraulic system to which the hydraulics of the implement are flow-coupled and thus also pressurized. As such, the operator must manually operate the hydraulic remotes to supply the hydraulic power needed to operate the lift actuators for the gull wings and the central bulk fill assembly.

Figure 6:
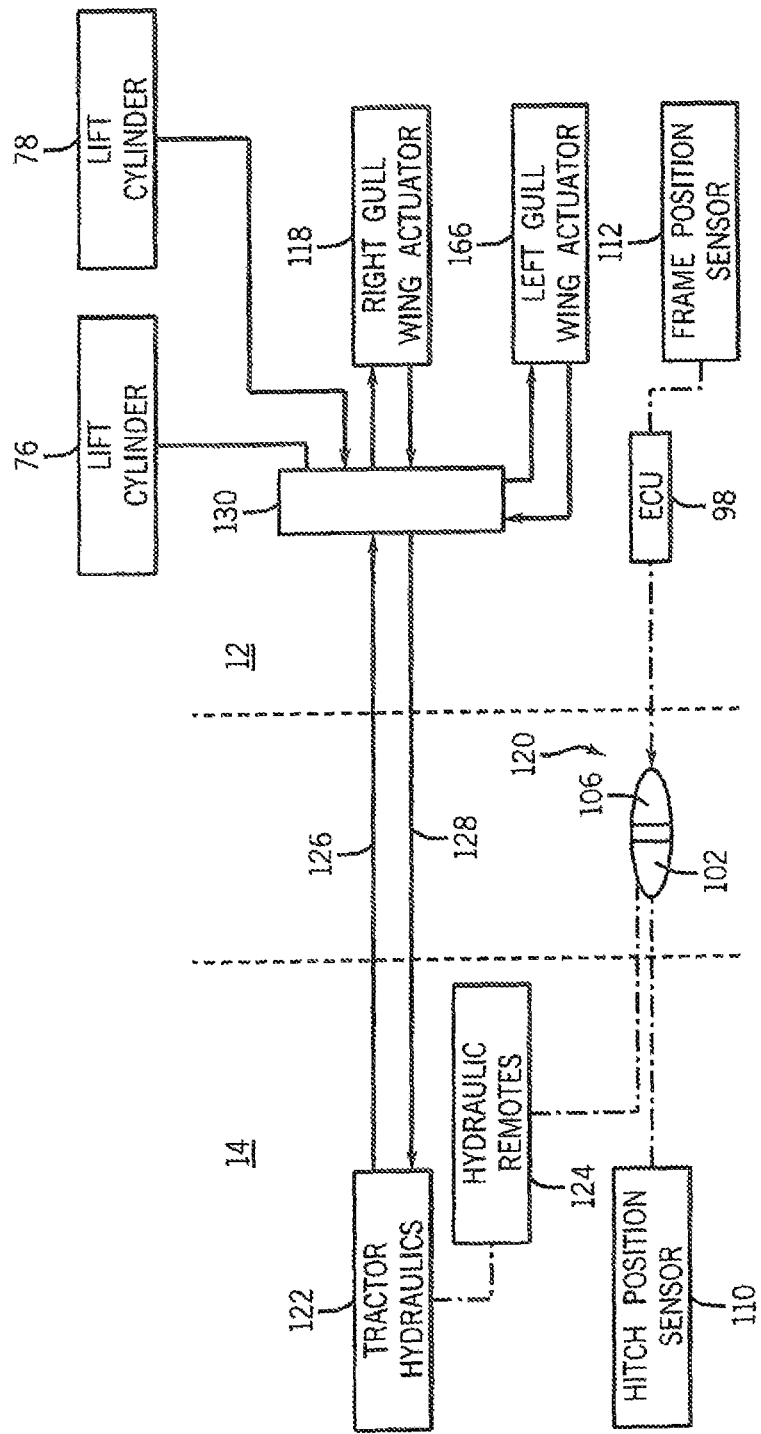
FIG. 6 is a schematic block diagram of a hydraulic control system according to another embodiment of the invention.

In contrast, and referring now to FIG. 6, a communications apparatus 120 according to an alternate embodiment of the invention controls operation of the hydraulic remotes automatically, i.e., uses the tractor hydraulics 122 to directly control operation of the wheel lift assembly 50 and the lift actuators 116, 118 rather than control an electronic-over-hydraulic valve 114. More particularly, the hitch position sensor 110 provides hitch position data to the implement ECU 98 across ISOBUS connection 96. The implement ECU 98 uses the hitch position information together with frame position data read from the frame position sensor 112 and provides control commands to the hydraulic remote(s) 124, which are connected to the tractor hydraulics 122 in a known manner. The tractor hydraulics are flow-coupled to the actuators of the wheel lift assembly 50 and the lift actuators 116, 118. It is understood that the actuators could be independently flow coupled to the tractor hydraulics, but preferably, a single supply conduit 126 and return conduit 128 that are coupled to a manifold 130 or similar distribution device to which the actuators for the wheel assembly and the lift actuators are flow coupled in a conventional manner. It will thus be appreciated that in the embodiment illustrated in FIG. 6, the implement controls the hydraulics of the tractor based on commands transmitted to the tractor via the ISO-BUS connection.

It will be appreciated that in one embodiment of the invention, the position of the tractor hitch is used to adjust the vertical position of the implement frame. It is understood however that in another embodiment, the vertical position of the implement frame could be monitored to cause automatic adjustment of the tractor hitch.

Many changes and modifications could be made to the invention without departing from the spirit thereof. The scope of these changes will become apparent from the appended claims.

The invention claimed is:

1. A method for automatically leveling a farm implement having a frame and a pair of gull wings pivotally coupled to the frame, and being towed by a tractor that is coupled to the farm implement by a hitch and has a hydraulic system controllable by at least one hydraulic remote, comprising:
   receiving a hitch position signal from the tractor with an electronic control unit (ECU);
   receiving a frame position signal with the ECU from a sensor that detects a position of the frame; and
   operatively connecting the ECU to the hydraulic system, the ECU being configured to provide operational commands to the hydraulic remote of the tractor based on the hitch position signal and the frame position signal to automatically raise and lower the frame in response to changes in hitch position of the tractor.

2. The method of claim 1 wherein providing the operational commands includes transmitting commands to the hydraulic remote of the tractor via an ISOBUS connection.

3. The method of claim 2 further comprising providing a go-to-float command signal to the remotes of the tractor when the hitch position signal indicates that the hitch is in a fully lowered position, and wherein the go-to-float command signal commands the remotes to allow the pair of gull wings to float so as to respond to changes in field contours.

4. The method of claim 1 further comprising providing operational commands to the hydraulic remote of the tractor based on the hitch position signal and the frame position signal to automatically raise and lower the pair of gull wings in response to changes in hitch position of the tractor.

5. The method of claim 1 further comprising automatically placing the pair of gull wings in a float position when the hitch of the tractor is in a fully lowered position.

6. The method of claim 5 wherein the frame supports a bulk fill hopper, and further comprising automatically raising and lowering the frame to maintain the bulk fill hopper in a level position.

* * * * *